Patented Dec. 25, 1951

2,580,050

UNITED STATES PATENT OFFICE 2,580,050

TOUGH STYRENE-OLEFIN COPOLYMERS CONTAINING TWO TO TEN PER CENT OF WAX

William J. Sparks, Cranford, and Paul E. Hardy, Elizabeth, N. J., assignors to Standard Oil Development Company, a corporation of Delaware No Drawing. Application December 29, 1944, Serial No. 570,485

4 Claims. (Cl. 260—28.5)

This invention relates to novel plastic compositions and to methods of preparing and using same, and particularly it relates to the modification of high molecular weight hydrocarbon copolymers of a particular type by incorporating a minor amount of a wax therein, whereby the resulting compositions are found particularly suitable for the preparation of self-sustaining films for use as moisture-proof wrappers, etc. The copolymers used belong to the general class of copolymers comprising a cyclic polymerizable hydrocarbon and an alkene.

U. S. Patent 2,274,749 describes copolymers of the general type referred to above, such as copolymers of isobutylene and styrene, and methods of preparing same, such as copolymerizing said reactants at a temperature below about 0° C. in the presence of an active halide polymerization catalyst, preferably in the presence of an inert volatile organic liquid serving as solvent, diluent and/or refrigerant. The temperature may vary considerably; for instance, it may be —10° C., —50° C., —80° C., —103° C. or even lower. By adjusting the proportions of the two raw materials, copolymers of desired hardness, melting point, plasticity, etc., may be obtained.

For convenience and brevity the above-described copolymer of a cyclic polymerizable hydrocarbon and an olefin or alkene will be referred to as a cycalkene copolymer, or more simply a cycalkene. The specific type of copolymer made from styrene and isobutylene will similarly be referred to as simply stybutene. The invention will be illustrated as applied particularly to stybutene, although it is not to be limited specifically thereto.

It has been suggested in the patent referred to above that cycalkene copolymers can be mixed with wax, and such admixtures have proved quite useful in the case of low molecular weight, soft or sticky copolymers of relatively low cyclic content, because such materials are readily compatible with paraffin and other waxes, and greatly improve the adhesivity thereof for use in making laminated materials and for other purposes. However, great difficulty has been encountered in attempts to compound wax with cycalkene copolymers having high molecular weight or high intrinsic viscosity, particularly such copolymers having more than a very low content of combined cyclic constituents.

One object of the present invention is to provide a suitable method for incorporating minor amounts of a wax to certain of these high intrinsic viscosity copolymers, in order to accomplish a certain plasticizing effect and at the same time greatly improve the resistance of such copolymers to moisture vapor penetration. Another object is to provide improved copolymer compositions which are particularly adapted for forming self-sustaining films, which are particularly useful as moisture barriers and as moisture proof wrappers, etc. Other objects and advantages of the invention will be apparent to those skilled in the art from a reading of the following specification.

Broadly, the invention comprises compounding with a cycalkene copolymer having an intrinsic viscosity greater than 0.5 and containing a combined cyclic constituent between the relatively narrow limits of 30% to 60% by weight, with a minor proportion of a wax. Particular methods of accomplishing this compounding, for preferred results, will be discussed further here below.

In regard to the raw materials used in preparing the cycalkene copolymer, it may be mentioned that instead of isobutylene other aliphatic olefins may be used, preferably having more than 2 carbon atoms and preferably iso-olefins having 4 to 8 carbon atoms, such as isopentene (2-methyl 2-butene) or a pentene obtained by dehydration of secondary amyl alcohol.

Instead of styrene, other materials such as substituted styrenes, e. g. alpha methyl styrene, para methyl styrene, or indene, terpene, etc. can be used.

For the preparation of the plastic compositions of the present invention, the proportion of cyclic polymerizable constituent of the copolymer must be neither too high nor too low, the general range found suitable being about 30% to 60% by weight, and the preferred range is 40% to 55% by weight. For instance, in the case of stybutene, the proportion of combined styrene should be about 40% to 55% by weight while the proportion of isobutene should be about 60% to 45% by weight.

In preparing the copolymer suitable for use according to this invention, it is also essential that a copolymerization temperature below about —50° C. be used, e. g. —65° C., —78° C. (Dry Ice temperature), —103° C. (the boiling point of liquid ethylene), or even lower.

The copolymerization is effected by mixing the two reactants, with or without a mutual solvent, such as ethylene, propane, butane, methyl chloride, refined naphtha, etc., and then after cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex-(AlCl$_3$.Al[OC$_2$H$_5$]$_3$) and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane, at or below the boiling point of the catalyst solvent, and then the catalyst solution cooled down, filtered and added to the reaction mixture. Alternative catalysts include: $AlCl_3.AlCl_2OH$, $AlBr_3.AlBr_2OH$, $AlBr_2Cl.AlOCl$, $AlBrCl_2.AlOBr$, $TiCl_4.AlCl_2OH$, $TiOCL_2.TiCl_4$, $AlBr_3.Br_2.CS_2$, $BF_3$.isopropyl alcohol, $BF_3$ solution in ethylene, activated $BF_3$ catalyst in ethylene solution, activated $BF_3$ catalyst in methyl chloride solution. Volatile solvents or diluents, e. g. propane, ethane, ethylene, methyl chloride, carbon dioxide (liquid or solid), etc. may also serve as internal or external refrigerants to carry off the liberated heat of polymerization. After completion of the copolymerization residual catalyst is killed with alcohol, for example, isopropyl and excess catalyst removed by washing the product with water and preferably also with dilute aqueous caustic soda. The resulting solid copolymer may range from a relatively stiff plastic mass to a hard tough thermoplastic solid, depending upon the temperature of polymerization, the yield of polymer obtained from the active feed, the type and concentration of catalyst, the proportion of cyclic reactant in the feed, and the temperature at which the physical texture is observed. The proportions in which the reactants, e. g. styrene and isobutylene, have actually combined during copolymerization may be determined by interpolation of a carbon-hydrogen analysis between the limits, for instance:

|  | Carbon | Hydrogen |
| --- | --- | --- |
| Pure styrene _____ per cent__ | 92.3 | 7.7 |
| Pure isobutylene _____ do____ | 85.7 | 14.3 |

Generally the molecular weight of the copolymers made under the particular conditions referred to above will range from about 10,000 upwards, for instance, 15,000, 25,000, 50,000, 100,000 and higher, and the intrinsic viscosity of these copolymers will range from about 0.5 upward, e. g. 0.6, 0.8, 1.2, 1.5, 2.0, 3.0 or higher. Usually copolymers having the higher molecular weights will be made at the lowest copolymerization temperatures and with the lower proportions of cyclic constituent.

The wax which is to be compounded with the above described copolymer may be selected from any of the natural or synthetic waxes of a predominantly aliphatic type, for instance, suitable aliphatic hydrocarbon waxes include paraffin wax of various melting points ranging from about 115° F. to 160° F. or so, as well as so called amorphous waxes including petrolatum and de-oiled petrolatum (sometimes referred to as microcrystalline wax). Also, one may use oxygen-containing aliphatic waxes either such as the natural vegetable waxes, e. g. carnauba, beeswax, etc. or synthetic wax, e. g. hydrogenated castor oil, polyethylene oxide, etc. In general such waxes should contain less than about 30% of oxygen.

The proportions in which the copolymer and the wax should be compounded, will depend to some extent upon the intended use of the composition, as well as the particular physical characteristics of the copolymer and the wax, but normally the wax should be used in only a minor proportion such as 0.5% to 40% and preferably about 1% to 20%, with even the best results being obtained by the use of about 2% to 10% by weight. If the purpose of adding the wax to the copolymer is primarily for the plasticizing effect, the amount of the wax required will be greater for copolymers containing the relatively higher proportions of combined cyclic constituent, as such copolymers e. g. a stybutene containing 50% to 60% of combined styrene, will in general be harder and tougher than those made with the relatively lower proportions of cyclic constituent e. g. a stybutene containing 30% to 40% of combined styrene.

Usually the wax requirement will be relatively greater for copolymers within the upper limits of intrinsic viscosity e. g. 1.5 to 2.0 or so, than for copolymers within the lower range of intrinsic viscosity e. g. 0.5 to 1.0 or so. As will appear more clearly from the detailed examples given here below, there is frequently a certain relatively narrow proportion of wax which when compounded with the copolymer imparts thereto superior characteristics e. g. tensile strength, resistance to moisture vapor penetration, etc. than can be obtained with either lesser or greater amounts of the wax.

If desired, small amounts of other optional addition agents may be incorporated into the compositions of this invention either after the two primary ingredients have been mixed together or by premixing with either one of the ingredients separately. For instance, such addition agents include dyes, pigments, antioxidants etc.

In carrying out the invention, some difficulty may be encountered in mixing the wax and the copolymer, chiefly due to the high intrinsic viscosity and relative toughness of this particular type of copolymer, even when heated to temperatures as high as 230° C. A preferred method of effecting suitable mixing is first to heat the copolymer on a warm mill such as the rolls commonly used for milling rubber, using a temperature of about 125° C. to 150° C. and then slowly add small portions of wax to the copolymer as it is being milled. If the wax is added too rapidly, the polymer becomes so slippery that it will not mill at all, but if the wax is added slowly, little trouble is encountered.

This improved method of making wax-copolymer blends, which is quite a different process from merely melting the wax and stirring in the copolymer as can be done with copolymers of lower intrinsic viscosity, has even been found suitable for making wax-copolymer compositions containing a major proportion of wax such as by first milling into all of the copolymer to be used a minor proportion of the wax, e. g. 25% to 35% or so as advocated above, then heat the resulting mixture to a substantially melting temperature of about 125° C. to 200° C. e. g. 150° C., and then add the rest of the wax, preferably in a molten or at least softened condition, to the wax-copolymer melt with stirring until the entire composition is homogeneous. By this method compositions containing major amounts of wax such as 50% to 99% or so can be made satisfactorily.

The novel compositions of this invention are particularly adapted for the preparation of self-sustaining films having unexpectedly superior characteristics, one of which is improved resistance to moisture vapor penetration. Many plastic, rubbery or resinous materials either occurring in nature or made synthetically heretofore, particularly high molecular weight polymeric materials such as rubber, polybutene, polystyrene, etc. either cannot at all, or else only with great difficulty be sheeted out into thin self-supporting films because they are either too brittle or have too much cold flow or too much "nerve," etc. The improved wax-copolymer compositions of this invention are found to have a surprisingly good combination of physical properties for enabling them to be satisfactorily sheeted into self-sustaining films having a thickness down to 0.01 inch or even 0.001 inch or even lower. For instance, they have much better tensile strength and toughness than similar compositions made with copolymers having an intrinsic viscosity less than 0.5, which are in general too soft or lacking in tensile strength to hold together as a self-sustaining sheet. On the other hand they lack the brittleness of compositions made with copolymers containing much higher content, e. g. 70% or 80%, of combined cyclic constituent, and furthermore, such latter type of copolymer is generally too incompatible with an aliphatic wax such as paraffin wax to permit the preparation of truly homogeneous composition as is required for sheeting into satisfactory thin self-sustaining films.

The compositions of this invention when sheeted into thin films are advantageously used as moisture barriers, for instance, as a wrapping material for foods, either to prevent loss of moisture therefrom as in the case of bread, pastry, cheese, fresh fruits, vegetables, etc., or to prevent adsorption of moisture from the air as in the case of relatively drier foods such as breakfast food cereals, dried fruits and vegetables etc., or for wrapping other types of commercial or industrial products such as electric dry cell batteries, various powdered products, tobacco, cigarettes, cigars.

Instead of being used entirely alone as a self-sustaining sheet or film, this composition can also be used advantageously in laminated sheet materials in conjunction with other materials such as paper, cloth, metal foil, regenerated cellulose, cellulose acetate or various other synthetic plastic sheets, particularly those which have greater moisture vapor permeability than desired. Such other types of plastics are substantially improved by having a smooth continuous film of the present compositions either on one or both sides thereof. The compositions of this invention may also be advantageously utilized for coating and/or impregnating various materials such as porous or fibrous materials, e. g. paper, cloth, wood, brick, concrete, tile, etc. or non-porous materials such as metallic articles such as iron, steel, aluminum, tin, copper, etc. either as a coating for preventing corrosion, protection against chemical agents, etc., or a liner on the interior of containers such as beer cans, tank cars, pipes, etc. Such coating or impregnating can be done by various methods such as hot roll coating, spraying, dipping, brushing, spreading with a blade, or any other suitable method, either in a softened condition alone or further fluidized by either a small or major proportion of a volatile solvent such as naphtha, toluene, benzene, etc. or mixtures thereof. These wax-copolymer compositions may also be applied as a thin coating film or thin non-porous sheet to material such as metal foil, homogeneous cellulosic film such as regenerated cellulose, cellulose acetate etc. or various vinyl polymer films e. g. polyvinyl chloride, polyvinyl acetate, or copolymers thereof, or polyvinylidine chloride, etc.

The wax-copolymer compositions of this invention are also very useful as electrical insulation, either in the form of a self-sustaining sheet or film which may be used for strip coating an electrical conductor such as a wire or cable or for spiral wrapping such conductors or they may be extruded around the conductor or they may be used in sheet form as dielectric material in electrical conductors. These compositions may also be also be first coated or impregnated on paper, cloth, etc. before using for such electrical insulation purposes.

Other objects and advantages of the invention will be better understood from a consideration of the following examples.

*Example 1*

Stybutene copolymer having about 60% combined styrene content and having an intrinsic viscosity of about 0.8 was prepared by copolymerizing at a temperature of about −95° C. a mixture of 100 volumes of liquid isobutylene and 100 volumes of styrene with about 800 volumes of methyl chloride serving as diluent, and by the use of a catalyst consisting of $AlCl_3$ dissolved in methyl chloride which was added slowly to the polymerizable constituent with agitation. After the reaction was completed the catalyst was hydrolyzed by addition of 10 volumes of isopropyl alcohol and then the resulting copolymer was washed and dried by hot milling. Various amounts up to 30% of a paraffin wax having a melting point of about 125° F. were milled into the resulting stybutene at a temperature of about 150° C., and then each composition was sheeted out into a film having a thickness of about 0.01 inch and each film was tested for tensile strength, with the following results:

| Per Cent Wax Added to Stybutene | Tensile, lbs./sq. in. |
| --- | --- |
| 0 | 1,800 |
| 4 | 2,000 |
| 10 | 1,900 |
| 20 | 1,500 |
| 30 | 1,050 |

These results show that the addition of about 4% of paraffin wax to the stybutene actually effected an increase in the tensile strength from 1800 lbs./sq. in. up to 2000 lbs./sq. in., and that up to 10% of wax could be tolerated without impairing the tensile strength of the copolymer.

*Example 2*

Another sample of stybutene having a combined styrene content of about 60%, in which about 2% by weight of zinc stearate had been incorporated as a plasticizer, was tested for moisture vapor penetration both alone and together with various amounts of paraffin wax up to 20% by the standard ASTM test (designation D697–42T), with a desiccant method in which the samples in the form of thin sheets or films having a thickness of about .004 to .010 in. are tested at 25° C. at 50% relative humidity and for 144 hours. The results were as follows:

| Per Cent Wax Added to Copolymer | Moisture Vapor Penetration (g. $H_2O$/24 hrs./sq. m.) Calculated for a Film Thickness of 0.004 inch |
| --- | --- |
| 0 | 1.25 |
| 5 | 0.97 |
| 10 | 0.58 |
| 15 | 0.52 |

The above results indicate clearly that the addition of paraffin wax to the copolymer effected a very marked reduction in moisture vapor penetration, the greatest improvement being obtained with the first 10% addition of paraffin wax, but with very little improvement with more than 10% of paraffin wax.

Example 3

Another series of tests somewhat similar to those of Example 2 was carried out by using a stybutene having a combined styrene content of about 50% and having an intrinsic viscosity of about 0.9, but not containing any zinc stearate or any other plasticizers. The moisture vapor penetration results, without and with paraffin wax were as follows:

| Per Cent Wax Added to Copolymer | Moisture Vapor Penetration (g. $H_2O$/24 hrs./sq.m.) Calculated for a Film Thickness of 0.004 inch. |
|---|---|
| 0 | 0.92 |
| 10 | 0.57 |
| 20 | 0.49 |

These results indicate that although the stybutene having a combined styrene content of only 50% has a much lower vapor moisture penetration than the one containing 60% of combined styrene, yet the addition of 10% or 20% of paraffin wax effects a remarkable still further reduction in moisture vapor penetration.

Example 4

The tests made in Example 3 were duplicated except that a microcrystalline wax was used instead of paraffin wax, moisture vapor penetration results being as follows:

| Per Cent Wax[1] Added to Copolymer | Moisture Vapor Penetration (g. $H_2O$/24 hrs./sq.m.) Calculated for a Film Thickness of 0.004 inch. |
|---|---|
| 0 | 0.92 |
| 10 | 0.33 |
| 20 | 0.13 |

[1] Microcrystalline wax having a melting point of about 165° F.

The above results show that microcrystalline wax is even superior to paraffin wax for reducing the moisture vapor penetration of films of stybutene copolymer.

Example 5

Small amounts, ranging up to 10%, of a commercial sample of polyethylene oxide, identified as Carbowax 4000, having a molecular weight of about 4000, and a melting point of about 55° C., were compounded into a stybutene having a combined styrene content of about 50% and an intrinsic viscosity of about 0.9 by slowly adding the wax to the copolymer while working the latter on a warm mill at about 125° C. The resulting blend had a smooth, homogeneous texture and a better workability than the plain copolymer.

Example 6

Carnauba wax was also found compatible and useful in amounts up to about 35% for plasticizing and otherwise improving a stybutene similar to that used in Example 5. Carnauba wax has a relatively higher melting point than the paraffin wax and the polyethylene oxide, and did not tend to "grease" the copolymer so readily; it could be added in the form of chipped pieces directly to the rolling bank of copolymer on the warm mill much more rapidly than could either the paraffin wax or the polyethylene oxide. Here again, however, the best blended compositions were obtained with about 5%–10% or 15% of the wax.

It is not intended that this invention be limited to the specific examples which have been given merely for the sake of illustration, but only by the appended claims in which it is intended to claim all novelty inherent in the invention as well as all modifications coming within the scope and spirit of the invention.

We claim:

1. An article comprising a self-sustaining film consisting essentially of 2% to 10% by weight of a microcrystalline petroleum wax and the remainder a copolymer of a styrene and isobutylene, said copolymer having an intrinsic viscosity in the range of approximately 0.6 to 3.0 and containing about 50% to 60% by weight of combined styrene.

2. Composition comprising about 2 to 10% by weight of a petroleum hydrocarbon wax and about 90 to 98% by weight of styrene-isobutylene copolymer having a combined styrene content of about 50 to 60% by weight, an intrinsic viscosity of 0.6 to 3.0, and a molecular weight of at least 10,000, said wax-copolymer composition being adapted to be sheeted into thin self-supporting films, having moisture vapor penetration substantially lower than do films of similar thickness made of the copolymer alone.

3. An article comprising a self-sustaining film consisting essentially of 2 to 10% by weight of paraffin wax and, homogeneously compounded therewith, 90 to 98% by weight of styrene-isobutylene copolymer having a combined styrene content of about 60% by weight, an intrinsic viscosity of about 0.8, a tensile strength of at least about 1800 lbs./sq./in., and a molecular weight of at least 10,000, said wax-copolymer film having a tensile strength substantially greater than that of the copolymer alone, and said film having a moisture vapor penetration substantially less than that of a film of similar thickness of the same copolymer alone.

4. An article comprising a self-sustaining film consisting essentially of 2 to 10% by weight of a petroleum wax, and homogeneously compounded therewith, 90 to 98% by weight of styrene-isobutylene copolymer having a comprised styrene content of about 50% by weight, an intrinsic viscosity of about 0.9, and a molecular weight of at least 10,000, said wax-copolymer film having a moisture vapor penetration substantially lower than that of a film of similar thickness made of said copolymer alone.

WILLIAM J. SPARKS.
PAUL E. HARDY.

REFERENCES CITED

The following references are of record in the file of this patent:

UNITED STATES PATENTS

| Number | Name | Date |
|---|---|---|
| 2,274,749 | Smyers | Mar. 3, 1942 |
| 2,345,717 | Turner | Apr. 4, 1944 |

OTHER REFERENCES

Slotterbeck et al.: "Official Digest," #240, November 1944, pp. 511–516.

Cunningham: "The S-Polymers," Rubber Age, November 1947, page 187.